United States Patent [19]

Zyss

[11] 4,113,885
[45] Sep. 12, 1978

[54] METHOD OF PRODUCING CURED LOW SODIUM MEAT PRODUCTS

[76] Inventor: Thadeus B. Zyss, 7088 Browning Rd., Highland, Calif. 92346

[21] Appl. No.: 811,165

[22] Filed: Jun. 29, 1977

Related U.S. Application Data

[63] Continuation-in-part of Ser. No. 660,110, Feb. 23, 1976, abandoned.

[51] Int. Cl.$^2$ ............................ A23B 4/02; A23L 1/27
[52] U.S. Cl. .................................... 426/264; 426/281; 426/332; 426/645; 426/652; 426/804
[58] Field of Search .................. 426/72, 74, 250, 264, 426/265, 266, 268, 281, 311, 332, 540, 641, 645, 647, 648, 650, 652, 654, 658, 804

[56] References Cited

U.S. PATENT DOCUMENTS

| 2,910,369 | 10/1959 | Klein | 426/332 |
| 2,930,703 | 3/1960 | Harper | 426/266 X |
| 2,955,042 | 10/1960 | Firor et al. | 426/332 X |
| 3,782,975 | 1/1974 | Zyss | 426/281 |
| 3,966,974 | 6/1976 | Bharucha et al. | 426/265 |

Primary Examiner—Arthur L. Corbin
Attorney, Agent, or Firm—Donald Diamond

[57] ABSTRACT

A method is provided for curing fresh primal cuts of meat intended for consumption by those on a low sodium diet which includes the step of subjecting a fresh primal cut to an aqueous curing solution substantially free of (a) organic nitrites and (b) chloride, phosphate, nitrate and sodium ions and containing from about 0.005 to about 0.40 percent by weight of a nitrite selected from the group consisting of potassium nitrite, ammonium nitrite, nitrous acid and mixtures thereof.

9 Claims, No Drawings

METHOD OF PRODUCING CURED LOW SODIUM MEAT PRODUCTS

CROSS-REFERENCE TO RELATED APPLICATION

This application is a continuation-in-part of U.S. patent application Ser. No. 660,110 on Feb. 23, 1976, and entitled Method Of Producing Cured Low Sodium Meat Products, now abandoned.

BACKGROUND OF THE INVENTION

This invention relates to the injection curing of fresh primal cuts of meat intended for consumption by individuals on a low sodium diet and, more particularly, to aqueous injection curing solutions which are substantially free of (a) organic nitrite and (b) chloride, phosphate, nitrate and sodium ions and which contain, as the sole curing agent, a nitrite selected from the group consisting of potassium nitrite, ammonium nitrite, nitrous acid and mixtures thereof.

The term "primal cuts" as used herein refers to definitions promulgated by the American Meat Institute which shall include ham, bacon, corned beef, cured beef and pastrami.

In the curing of bacon, corned beef and pastrami, the meat is injected with the curing solution by a procedure known as stitch pumping in which the solution is pumped directly into the tissues through a large number of closely spaced, hollow needles.

Arterial pumping is used to inject the curing solution into ham, although a procedure similar to stitch pumping could also be employed. In arterial pumping, the solution is injected into the vascular system of the ham through a hollow needle inserted in, for example, the femoral artery. The curing solution is carried through all of the capillaries and establishes equilibrium with the tissue cells.

In the curing of primal cuts by the injection process, the meat is pumped to about 110 percent of its weight with the aqueous curing solution. Where the curing solution is added to ham in an amount exceeding 10 percent of its "green weight" or raw weight as, for example, in an amount corresponding to 10 to 15 percent of its green weight, the ham is labelled "water added"; and if the curing solution is added in an amount from 15 to 20 percent or more of its green weight, the product is labelled "imitation ham."

After the pumping step, the primal cuts may be maintained at a cooling temperature between about 32° and 42° F. for about 1 to 5 days. Following the cooling step, the primal cuts may be further processed by heating and smoking. The cured meats are refrigerated or frozen until sold or processed into canned products.

A typical, non-dietetic, curing solution for primal cuts contains sodium chloride, sodium nitrite, sodium nitrate, suger and/or honey, sodium phosphate, sodium ascorbate and condiments.

Although most people can readily ingest primal cuts cured with a conventional sodium chloride brine, there are certain individuals, particularly those with heart disease and related ailments, who require a low sodium diet. These persons have relatively little variety in their diet because of the small number of low sodium foods. Additionally, other people who could benefit from a low sodium diet, but who do not suffer severely from sodium chloride containing foods, usually do not stay on the prescribed or recommended diet because of the poor selection of low sodium foods. Thus, the production of low sodium primal cuts would be of substantial benefits to those persons who are on a low sodium diet because it would increase the variety of foods available for their selection and consumption.

PRIOR ART

U.S. Pat. No. 2,937,094 (Rupp et al., 1960) discloses an aqueous curing soltuion for hams containing sodium chloride, sodium or potassium nitrite or nitrate, a phosphate mixture of, for example, tetrasodium (or potassium) pyrophosphate and monosodium (or potassium) orthophosphate, sugar and spices.

U.S. Pat. No. 3,447,932 (Olson et al., 1969) discloses that potassium salts of polyphosphates and pyrophosphates can be used in conjunction with limited amounts of potassium chloride as a substitute for sodium chloride in the manufacture of dietetic sausage and meat loaf products.

U.S. Pat. No. 3,782,975 (Zyss, 1974) discloses an aqueous curing solution for primal cuts which is free of sodium and chloride ions except for the nominal amount present in commercial water supplied used in making up the solution and which contains, as the sole water binding and retention agent, a water soluble, non-toxic, potassium phosphate composition. The curing solution may be further formulated with potassium nitrite, potassium nitrate, potassium ascorbate, sugar and condiments.

U.S. Pat. No. 3,966,974 (Bharucha et al., 1976) discloses that an organic nitrite such as n-butyl nitrite in conjunction with an edible emulsifying agent can be substituted for conventional sodium nitrite and sodium nitrite-sodium nitrate combinations in the preparation of aqueous curing solutions for primal cuts.

Thus, the aforesaid prior art compositions used in the curing of primal cuts and the preparation of sausage products contained (a) phosphate ions without sodium or chloride ions, (b) phosphate plus chloride ions without sodium ions, (c) phosphate plus chloride plus sodium ions, or (d) organic nitrite.

SUMMARY OF THE INVENTION

In accordance with this invention, a method is provided for curing fresh primal cuts of meat which does not require the presence of the phosphate ion, the chloride ion or the sodium ion and which includes the step of subjecting a fresh primal cut to an aqueous curing solution containing from about 0.005 to about 0.40% by weight of a nitrite selected from the group consisting of potassium nitrite, ammonium nitrite, nitrous acid and mixtures thereof. The curing solution is free of (a) organic nitrites and (b) phosphate, chloride, nitrate and sodium ions except for the monimal amount present in commercial water supplies used in making up the solution and, typically, is further formulated with special purpose additives such as potassium ascorbate, sugar and condiments. The curing solution is added to the primal cuts in an amount corresponding to about 1 to about 20% of their weight.

DETAILED DESCRIPTION

The curing solutions used in the method of this invention are prepared by dissolving the nitrite composition and sodium free additives in water. The water soluble, inorganic, nitrite compositions employed herein include potassium nitrite, ammonium nitrite, nitrous acid and mixtures thereof. The concentration of the water soluble, nitrite composition in the aqueous curing solution is generally in the range of about 0.005 to about 0.40% by weight and preferably in the range from about 0.05 to about 0.25% by weight. The nitrite composition provides the chemical constituent which reacts with the meat to produce the cured meat color. At the present time, the legal limit for nitrite is 2 pounds per 100 gallons of curing solution and the completely processed primal cuts may not contain more than 200 parts of nitrite per million parts of meat.

Ascorbic acid, erythorbic acid, potassium and ammonium salts of these acids and mixtures thereof are advantageously included in the curing solution in an amount from about 0.1 to about 0.9% by weight in order to shorten the curing time and add stability to the cured meat pigment. The present legal limit for the acids is 75 ounces per 100 gallons of curing solution while the legal limit for the salts of the acids is 87.5 ounces per 100 gallons of curing solution. (Erythorbic acid is the trivial name adopted officially for d-erythroascorbic acid, formerly called isoascorbic acid.)

Sugar may also be included in the curing solution in an amount from about 1 to about 8% by weight in order to improve the flavor and taste of the cured product. The term sugar as used herein and in the claims includes sucrose, honey, dextrose, corn syrup solids and the like. The curing solution may be further formulated with flavorings and spices to provide special flavor and taste.

The curing solution, which is usually at ambient temperature, is injected into hams by arterial pumping and into bacon, corned beef and pastrami by stitch pumping in an amount corresponding to about 1 to about 20% of the weight of the primal cut. The primal cuts during the pumping step are at a temperature between about 33° and 100° F. Following the pumping step, the primal cuts may be refrigerated for several days and then further processed by heating or by heating and smoking in accordance with procedures well known in the art. The internal temperatures must reach the minimum prescribed by USDA standards. Primal cuts cured in accordance with the method of this invention have texture and taste suitable for individuals on a low sodium diet.

EXAMPLES

The following examples further illustrate the method of the invention.

EXAMPLE I

Aqueous curing solutions are prepared having the following compositions:

| Ingredients | Quantity | | |
|---|---|---|---|
| | A | B | C |
| Water | 55 gal. | 55 gal. | 55 gal. |
| $KNO_2$ | 10 oz. | 10 oz. | 10 oz. |
| Erythorbic acid | | 11 oz. | 11 oz. |
| Sugar | | | 25 lb. |

Samples of medium size hams, sides of bacon, rounds and briskets of corned beef, and trimmed navels for pastrami are pumped separately with curing solutions A, B, and C to 110% of their green weight. The hams are injected with the curing solutions by arterial pumping and the other primal cuts are injected with the solutions by stitch pumping. After the pumping step, the primal cuts are refrigerated at 40° F. for 3 days.

Following refrigeration, the primal cuts are further processed by heating or heating and smoking. The hams, comprising first and second sets of 4 hams each, are heated at 130° F. for four hours without smoking after which one set is heated at 140° F. for 8 hours with heavy smoking and the other set is heated at 165° F. for 10 hours without smoking. The bacon slabs are smoked at approximately 135° F. for about ten hours at which time the internal temperature reaches 128° F. In the case of pastrami, the primal cuts are hung in the smokehouse and rubbed with a pastrami spice mixture in which no sodium chloride is present. The temperature is elevated in stages, with smoking to 125° F., 150° F. and 180° F. in accordance with the usual procedure. Corned beef was further processed by heating it in a steam oven at 160° F. until the internal temperature reaches 152° F.

The primal cuts produced by the method of this example have color, taste and texture suitable for individuals on a low sodium diet, although they are somewhat drier and more bland tasting than primal cuts cured with conventional sodium chloride brines.

EXAMPLE II

This example illustrates curing solutions having from 10 to 32 ounces of $KNO_2$ per 100 gallons of curing solution, as follows:

| Ingredients | Quantity | | |
|---|---|---|---|
| | E | F | G |
| Water | 100 gal. | 100 gal. | 100 gal. |
| $KNO_2$ | 32 oz. | 10 oz. | 10 oz. |
| Erythorbic acid | 75 oz. | | |
| Ascorbic acid | | 75 oz. | |
| Potassium erythorbate | | | 87.5 oz. |
| Sugar | | | 25 lbs. |
| Corn syrup solids | | 50 lbs. | |

EXAMPLE III

In this example, the curing solutions are based on 5 ounces of $KNO_2$ per 100 gallons of curing solution, as follows:

| Ingredients | Quantity | | |
|---|---|---|---|
| | I | J | K |
| Water | 100 gal. | 100 gal. | 100 gal. |
| $KNO_2$ | 5 oz. | 5 oz. | 5 oz. |
| Erythorbic acid | 15 oz. | | |
| Ammonium erythorbate | | 15 oz. | |
| Ammonium ascorbate | | | 15 oz. |
| Sugar | | 50 lbs. | 25 lbs. |

Samples of medium size hams, sides of bacon, rounds and briskets for corned beef, and the boned out shoulders for pastrami are pumped separately with the curing solutions identified in Examples II and III to 110% of their green weight. The hams are injected with the curing solutions by arterial pumping and the other primal cuts are injected with the solutions by stitch pumping. Thereafter, the primal cuts are processed in accordance with the procedure described in Example I.

The primal cuts treated with the curing solutions of Examples II and III have color, taste and texture suitable for individuals on a low sodium diet.

Having thus provided a written description of the invention, it should be understood that no undue limitations are to be imposed by reason of the specific examples but that the present invention is defined by the appended claims.

That which is claimed is:

1. In a method for curing fresh primal cuts of meat intended for consumption by those on a low sodium diet which does not require the presence of phosphate, chloride, nitrate or sodium ions, the step consisting essentially of:
   injecting an aqueous curing solution into a fresh primal cut in an amount corresponding to about 1.0 to about 20% of the weight of said primal cut,
   said curing solution being free of (a) organic nitrites (b) phosphate, chloride, nitrate and sodium ions except for the nominal present in commercial water supplies used in making up the solution; and
   said curing solution containing from about 0.005 to about 0.40% by weight of a nitrite selected from the group consisting of potassium nitrite, ammonium nitrite, nitrous acid and mixtures thereof.

2. The method of claim 1 wherein the concentration of the nitrite in the aqueous curing solution is from about 0.05 to about 0.25% by weight.

3. The method of claim 1 wherein the aqueous curing solution also contains from about 0.1 to about 0.9% by weight of a member selected from the group consisting of ascorbic acid, erythorbic acid, potassium salts of ascorbic and erythorbic acids, ammonium salts of ascorbic and erythorbic acids and mixtures thereof.

4. The method of claim 2 wherein the aqueous solution also contains from about 1 to about 8% by weight of sugar.

5. The method of claim 4 wherein the primal cut is at a temperature between about 33° and about 100° F. during the injection of the aqueous curing solution.

6. The method of claim 1 wherein the nitrite is potassium nitrite.

7. The method of claim 1 wherein the nitrite is ammonium nitrite.

8. The method of claim 1 wherein the nitrite is nitrous acid.

9. In a method for curing fresh primal cuts of meat intended for consumption by those on a low sodium diet which does not require the presence of phosphate, chloride, nitrate or sodium ions, the step consisting essentially of subjecting a fresh primal cut to an aqueous curing solution containing about:
   0.005 to 0.40% by weight of a nitrite selected from the group consisting of potassium nitrite, ammonium nitrite, nitrous acid and mixtures thereof;
   0.1 to 0.9% by weight of a member selected from the group consisting of ascorbic acid, erythorbic acid, potassium and ammonium salts of ascorbic and erythorbic acids, and mixtures thereof; and
   1 to 8% by weight of sugar;
   said curing solution being free of (a) organic nitrites and (b) phosphate, chloride, nitrate and sodium ions except for the nominal amount present in commercial water supplies used in making up the solution.

* * * * *